United States Patent [19]

Heaton

[11] Patent Number: 5,037,873

[45] Date of Patent: Aug. 6, 1991

[54] WATER-REPELLENT SILANE EMULSIONS COMPRISING COPOLYMERS OF ACRYLIC ACID AND ALKYL METHACRYLATES

[75] Inventor: Thomas F. Heaton, Jacksonville Beach, Fla.

[73] Assignee: PCR Group, Inc., Gainesville, Fla.

[21] Appl. No.: 390,790

[22] Filed: Aug. 8, 1989

[51] Int. Cl.$^5$ ............................................. C08K 5/54
[52] U.S. Cl. ................................... 524/267; 524/457
[58] Field of Search .............................. 524/267, 457

[56] References Cited

U.S. PATENT DOCUMENTS

| | | | |
|---|---|---|---|
| 3,941,864 | 3/1976 | Bosch et al. | 264/256 |
| 4,125,673 | 11/1978 | Roth et al. | 428/447 |
| 4,877,654 | 10/1989 | Wilson | 428/387 |

OTHER PUBLICATIONS

Lochhead, R. Y., Hemker, W. J., "Hydrophobically Modified Carbopol Resins", Soap Cosmetic Chem. Spec. 63(5), 28-99, 32-3, 84.

*Primary Examiner*—Joseph L. Schofer
*Assistant Examiner*—Jeffrey T. Smith
*Attorney, Agent, or Firm*—Hedman, Gibson, Costigan & Hoare

[57] ABSTRACT

There is provided aqueous silane emulsion compositions comprising hydrolyzable silanes, water thickening agents, water and optional buffers, biocides and water beading additives. The compositions are useful in rendering porous masonry substrates water repellent.

24 Claims, No Drawings

WATER-REPELLENT SILANE EMULSIONS COMPRISING COPOLYMERS OF ACRYLIC ACID AND ALKYL METHACRYLATES

This invention relates to water based systems which are especially useful in rendering porous substrates water repellent. More particularly, the present invention relates to emulsions of aqueous silanes, and/or oligomers thereof, comprising water thickening agents of acrylic acid and alkyl methacrylate copolymers which are stable under conditions of fluctuating temperatures such as freeze/thaw cycles and elevated storage temperatures. The compositions are useful for rendering porous masonry, cement and wood surfaces water repellent, even when water beading and biocide additives are included in the composition.

BACKGROUND OF THE INVENTION

The utility of silanes, especially alkylalkoxysilanes, as masonry water repellents is widely known. Compositions currently in use employ solutions of silanes in various organic solvents such as alcohols, see e.g. Seiler, U.S. Pat. No. 3,772,065 and Brown et al, U.S. Pat. No. 4,342,796; or hydrocarbons, see e.g. Linn, U.S. Pat. No. 4,525,213. Principle limitations of such solvent type compositions include the toxicity and the flammability of the solvents employed.

Aqueous silane compositions which are non-toxic and non-flammable have become important as effective masonry water repellent compositions, see Puhringer, U.S. Pat. No. 4,433,013., Schmidt, U.S. Pat. No. 4,517,375; and DePasquale et al., U.S. Pat. No. 4,648,904. Such compositions can have an important drawback, namely that the pH may tend to drift, which causes the silane to react with water and polymerize. This reduces their efficacy by reducing the content of active, water repellent ingredient. To address this problem, buffered silane emulsions were disclosed in commonly assigned U.S. patent application of Wilson, Ser. No. 07/189,146, filed May 2, 1988, and now allowed.

These emulsified compositions also suffer from the need to determine the optimum HLB value (hydrophilic lipophilic balance) for the particular silane to be emulsified and then the appropriate surfactants must be selected. Determination of the HLB and the selection of the appropriate surfactant can be a tedious job of trial and error. However, this knowledge is necessary in order to formulate a stable emulsion. Further, even after careful selection of the surfactant system, homogenization is usually required to keep the oil (silane) phase from separating out. Once an emulsion of this type has separated out due to freeze/thaw instability or other thermal cycling it is not easy to redistribute the oil in the internal phase without vigorous mechanical agitation. A further drawback to the current silane emulsions is the lack of any water bead when the product is initially applied to the concrete surface. This is due to the wetting effect of the residual surfactant left on the surface. There thus remains a need in the art to provide a water based composition which retains stability over a wide range of thermal cycling, does not require time consuming determination of a stable surfactant system and which allows for the addition of particulates, such as water beading additives, without having them precipitate out of the emulsion.

It has now been surprisingly discovered that the use of a neutralized copolymer of an acrylic acid and a long chain alkylmethacrylate as a water thickening agent satisifies this long felt need in the art. The copolymer is believed to be amphipathic so that it is strongly absorbed at the oil/water phase interface and as such also functions as a primary emulsifier. At the same time, it is believed that the polymer forms a three dimensional microgel structure that functions to suspend dispersed particles and the oil droplets of the emulsion. These compositions are quite different from the compositions of the prior art. The use of the water thickening agent makes the determination of the optimum HLB value at which the silane can be emulsified unnecessary. This water thickening agent will work equally well for most water insoluble silanes. The emulsification process does not require homogenization to form a stable emulsion and the use of this copolymer eliminates the need for other surfactants. It is also believed that the thixotropic properties provided by the copolymer allow for the dispersion of solid particulates, such as water beading additives. This allows for the desired effect of visual water repellency. Furthermore, the emulsions thus formed are stable under conditions of widely fluctuating temperatures such as freeze/thaw cycles and elevated storage temperatures.

SUMMARY OF THE INVENTION

According to the present invention there are provided aqueous silane emulsion compositions comprising effective amounts of: (a) a hydrolyzable silane essentially hydrolytically stable within a determinable pH range; (b) a water thickening agent which comprises the polymerization product of (i) an olefinically unsaturated carboxylic monomer; (ii) an acrylate ester of the formula

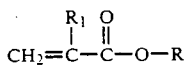

wherein R is an alkyl radical containing 10 to 30 carbon atoms and $R_1$ is hydrogen, methyl or ethyl; and optionally (iii) a polymerizable crosslinking monomer containing a $CH_2=C<$ grouping and at least one other polymerizable grouping, the unsaturated bonds of the polymerizable grouping being non-conjugated with respect to each other; (c) water; and optionally (d) at least one compound for buffering the pH of the composition within the determinable pH range. Preferred silanes are alkylalkoxysilanes. In another embodiment the aqueous silane emulsion composition further comprises (e) an effective amount of a water beading additive selected from the group consisting of micronized Teflon ® beads, fatty acid salts, wax and hydrophobic fumed silica; or (f) a small effective amount of a biocide; or both (e) and (f).

In another of its embodiments, the present invention also provides a process for increasing the resistance to penetration by aqueous media of a porous substrate by applying to the surface of the substrate the composition as above defined and allowing the composition to cure.

DETAILED DESCRIPTION OF THE INVENTION

When used herein and in the appended claims, the term "compound for buffering" contemplates any substances or combination of substances, which, when dissolved in water produces a solution which resists a change in its hydrogen ion concentration upon the addition of an acid or an alkali. Although this will call to the mind of those skilled in this art a large family of buffering compounds, numerous illustrations of typical buffering compounds will be set forth hereinafter.

By the term "masonry" used herein and in the appended claims, is meant any porous inorganic substrate, particularly building compositions and including but not limited to structural ceramics such as common brick, paving brick, face brick, sewer pipe, drain tile, hollow block, terra cotta, conduits, roofing tile, flue lining, cements such as Portland cement, calcined gypsum products, i.e., molding and building plaster and stucco, magnesia cement, insulation products such as electrical and thermal insulators (diatomaceous earth brick) and porcelain spark plugs, etc.

The masonry materials also include stone, tile, artificial stone, adobe, concrete and reinforced concrete such as found in roadways, bridge decks, airport runways, parking garage decks, and other concrete building structures.

The masonry materials which can be treated in accordance herewith are preferably dry when treated with the water repellent compositions, although they may be wet. In the case of settable masonry materials, the compositions of the present invention may be incorporated in the preset mixture, for example, into a concrete mix prior to casting and setting. Wood, structural timbers, siding and the like can also be made water repellent using this invention.

The Hydrolyzable Silane (a). The water-based compositions of the present invention preferably include as component (a) a hydrolyzable silane, for example, one with a molecular weight up to about 600 (or essentially a multiple thereof, if oligomerized) and the general formula of $R_n—Si—(R^1)_{4-n}$, wherein R is a $C_1-C_{30}$ hydrocarbyl or halogenated hydrocarbyl group, $R^1$ is a $C_1-C_6$ alkoxy, halide, amino, carboxyl, or a mixture of any of the foregoing, and n is 1 or 2. Preferably R comprises a $C_8-C_{30}$ alkyl group and $R'$ comprises a $C_1-C_3$ alkoxy group. The hydrocarbyl group comprises hydrogen and carbon atoms and may be aliphatic, or cycloaliphatic, or aryl, or aralkyl. These hydrocarbyl radicals may also contain as substituent groups, halogen, e.g., chlorine, bromine, fluorine; nitrogen; oxygen or sulfur heteroatoms. one or more of such halogen substituents may be present in the R Group. The $R^1$ group can comprise $C_1-C_6$ alkoxy, halogen, amino, or carboxylate group. Thus, among the alkyl groups useful as $R^1$ are methyl, ethyl, n-propyl, and isopropyl. As indicated, n may be 1 or 2 and thus, monohydrocarbyl substituted alkoxysilanes and dihydrocarbyl substituted alkoxysilanes are contemplated by the present invention. The active ingredients of the invention can also comprise condensation dimers and trimers, or other oligomers of the silanes, as are well known in the art. The hydrolyzable silanes (a) can range widely in amount. However, typically the amount can comprise from about 1 to about 40 percent by weight of the composition, and especially from about 1 to about 20 percent by weight.

Silanes especially useful in accordance with the present invention generally have a molecular weight in excess of 135 and preferably greater than 190 up to about 600 for the monomers. The dimers and trimers present in the composition will, of course, have essentially multiples of the molecular weights of the single specie of silane or silanes being used. It should be noted that mixtures of various silanes may be used, if desired.

Specific examples of silanes useful in accordance with the present invention include, but are not limited to, methyltrimethoxysilane, methyltriethoxysilane, methyltri-n-propoxysilane, ethyltrimethoxysilane, ethyltriethoxysilane, dimethyldimethoxysilane, dimethyldiethoxysilane, ethyltri-n-propoxysilane, propyltriethoxysilane, propyltri-n-propoxysilane, butyltrimethoxysilane, butyltriethoxysilane, dibutyldimethoxysilane, isobutyltrimethoxysilane, di-isobutyldimethoxysilane, isobutyltriethoxysilane, n-hexyltrimethoxysilane, 6-chloro-hexyltrimethoxysilane, 6,6,6-trifluorohexyltrimethoxysilane, cyclohexyltrimethoxysilane, 4-bromobenzyltri-n-propoxysilane, phenyltrimethoxysilane, phenyltriethoxysilane, octyltrimethoxysilane, octyltriethoxysilane, octyltriisopropoxysilane, 2-ethylhexyltrimethoxysilane, 4-chlorobenzyltrimethoxysilane, decyltrimethoxysilane, dodecyltrimethoxysilane, dodecyltribromosilane, tetradecyltriethoxysilane, hexadecyltriethoxysilane, octadecyltriethoxysilane, eicosyltrimethoxysilane, and the like, mixtures of any of them alone, and in admixture with dimers, trimers and other oligomers thereof.

The water thickening agent (b). The water thickening agents of the present invention are those generally disclosed in U.S. Pat. Nos. 2,798,053; 3,915,921 and 4,509,949. These may be commercially obtained from the B.F. Goodrich Company. An especially preferred commercial copolymer is Carbopol ® 1342. The water thickening agent (b) can range widely in amount. However, typically the amount can comprise from about 0.1 to about 50 percent by weight based on the hydrolyzable silane (a).

The carboxylic monomers useful in the present invention are the olefinically unsaturated carboxylic acids containing at least one activated carbon-to-carbon olefinic double bond, and at least one carboxyl group; that is an acid containing an olefinic double bond which readily functions in polymerization because of its presence in the molecule, either in the alpha-beta position with respect to a carboxyl group

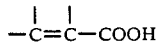

or as a part of a terminal methylene grouping $CH_2=C<$. Olefinically unsaturated acids of this class include such materials as the acrylic acids typified by acrylic acid itself, methacrylic acid, ethacrylic acid, alpha-chloroacrylic acid, alpha-cyanoacrylic acid, beta-methyl-acrylic acid (crotonic acid), alpha-phenylacrylic acid, beta-acryloxy propionic acid, sorbic acid, alpha-chloro sorbic acid, angelic acid, cinnamic acid, p-chloro cinnamic acid, beta-styryl acrylic acid, itaconic acid, citraconic acid, mesaconic acid, glutaconic acid, aconitic acid, maleic acid, fumaric acid and tricarboxy ethylene. As used herein, the term "carboxylic acid" includes anhydrides as well as the polycarboxylic acids and those acid anhydrides, such as maleic anhydride, wherein the anhydride group is formed by the elimination of one molecule of water from two carboxyl groups located on the same polycarboxylic acid molecule. Maleic anhydride and other acid anhydrides useful herein have the general structure

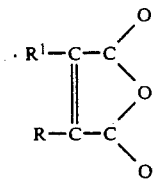

wherein R and R[1] are selected from the group consisting of hydrogen, halogen and cyanogen (—C≡N) groups and alkyl, aryl, alkaryl, aralkyl and cycloalkyl groups such as methyl, ethyl, propyl, octyl, decyl, phenyl, tolyl, xylyl, benzyl, cyclohexyl and the like.

The preferred carboxylic monomers are the acrylic acids having the general structure

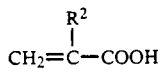

wherein $R^2$ is a substituent selected from the group consisting of hydrogen, halogen, cyanogen, monovalent alkyl radicals, monovalent aryl radicals, monovalent aralkyl radicals, monovalent alkaryl radicals and monovalent cycloaliphatic radicals. Most preferred are acrylic, methacrylic and ethacrylic acids. Another useful carboxylic monomer is maleic anhydride or the acid. The amount of carboxylic acid employed will preferably be from about 50.0 to about 98.8 weight percent of the total weight of the water thickening agent. More preferably, the range will be from about 60 to about 95 weight percent. Most preferably the carboxylic acid will be acrylic acid in an amount of from about 60 to about 95 weight percent.

Acrylic ester monomers include derivatives of an acrylic acid represented by the formula

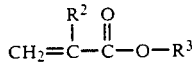

wherein $R^3$ is an alkyl group having from 10 to 30 carbon atoms, preferably 12 to 22 carbon atoms and $R^2$ is hydrogen, methyl or ethyl, and is present in the water thickening agent in amounts of from about 1 to about 50.0 weight percent, preferably from about 1.0 to about 38.9 weight percent based on the total weight of the water thickening agent. Most preferred is from about 1.0 to about 29.5 weight percent.

Representative acrylates include decyl acrylate, isodecyl acrylate, lauryl acrylate, dodecyl acrylate, stearyl acrylate, and the corresponding methacrylates, decyl methacrylate, isodecyl methacrylate, lauryl methacrylate, dodecyl methacrylate and stearyl methacrylate. Mixtures of two or three or more long chain acrylic esters may be successfully polymerized with one or more of the carboxylic monomers.

The polymers are optionally crosslinked with a polyfunctional vinylidene monomer containing at least two terminal $CH_2=C<$ groups, including for example, butadiene, isoprene, divinyl benzene, divinyl naphthalene, allyl acrylates and the like. Particularly useful are polyalkylene polyethers having one or more alkenyl ether grouping per molecule. The most useful possess alkenyl groups in which an olefinic double bond is present attached to a terminal methylene grouping, $CH_2=C<$. They are made by etherification of a polyhydric alcohol containing at least 4 carbon atoms and at least 2 hydroxyl groups. Compounds of this class may be produced by reacting an alkenyl halide, such as allyl chloride or allyl bromide, with a strongly alkaline aqueous solution of one or more polyhydric alcohols. The product is a complex mixture of polyethers with varying numbers of ether groups. Analysis reveals the average number of ether groups on each molecule. Efficiency of the polyether crosslinking agent increases the number of potentially polymerizable groups on the molecule. It is preferred to utilize polyethers containing an average of two or more alkenyl ether groupings per molecule. Other crosslinking monomers include, for example, diallyl esters, dimethallyl esters, allyl or methallyl acrylates and acrylamides, tetraallyl tin, tetravinyl silane, polyalkenyl methane, diacrylates, dimethacrylates, divinyl compounds such as divinyl benzene, polyallyl phosphate, diallyloxy compounds, phosphite esters and the like. Typical crosslinking agents are allyl pentaerythritol, allyl sucrose, trimethylolpropane diallyl ether, pentaerythritol triacrylate, tetramethylene dimethacrylate, ethylene diacrylate, triethylene glycol dimethacrylate and the like. Preferred crosslinking agents are allyl pentaerythritol, trimethylolpropane and allyl sucrose. The water thickening agents usually contain from about 0.1 to about 6 weight percent of the crosslinking agent, more preferably from about 0.1 to about 4 weight percent, and most preferably from about 0.1 to about 1 weight percent, based on the total weight of the water thickening agent.

Other vinylidene monomers may be used in place of the acid in small amounts so long as the basic properties of the water thickening agents are not adversely affected. Examples include acrylonitrile, methacrylonitrile, acrylamide, methacrylamide, styrene, vinyl toluene, vinyl methyl ether, vinyl ethyl ketone, butadiene, vinyl acetate, methyl acrylate, butyl acrylate, cyanopropyl acrylate, methoxy ethyl acrylate, chloroethyl acrylate, vinyl chloride, vinylidene chloride, esters of maleic and fumaric acid, bis(beta-chloroethyl) vinyl phosphonates, and the like as are known to those skilled in the art.

The carboxyl containing polymers generally have molecular weights greater than about 500 to as high as several million, usually greater than about 10,000 to about 900,000 or more.

Polymerization of the monomers is usually carried out in the presence of a free radical catalyst in a closed vessel in an inert atmosphere under autogenous pressure or artificially-induced pressure, or in an open vessel in an inert atmosphere under reflux at atmospheric pressure, in batch or continuous systems with proper agitation. Temperature of the polymerization may be varied from about 0° to about 125° C. or lower or higher. Polymerization at 25° to 90° C. using a free radical catalyst is generally effective in producing polymer yields of 75 percent to 100 percent. Typical free radical forming catalysts include peroxygen compounds such as sodium, potassium and ammonium persulfates, caprylyl peroxide, benzoyl peroxide, hydrogen peroxide, pelargonyl peroxide, cumene hydroperoxides, tertiary-butyl diperphthalate, tertiary-butyl perbenzoate, sodium peracetate, di(2-ethylhexyl)peroxydicarbonate, and the like as well as azo catalysts such as azodiisobutyrylnitrile. Other catalysts utilized are the so-called "redox" type of catalyst and the heavy metal activated catalyst systems. Ultra-violet light may also be utilized as a source of free radicals. Some systems polymerize solely by heat, but catalysts provide better control. The monomers may be batch charged or continuously added during the course of polymerization, or by any other manner of polymerization techniques conventionally used.

The polymerizations are conducted in an inert liquid media having some solubilizing effect on one or more of the monomeric ingredients, but substantially none on the resulting polymer. In other words, the medium used for the polymerization is one in which the monomers are preferably soluble and the polymer is substantially insoluble. Such materials are normally organic liquids which are solvents for the monomers, but nonsolvents for the polymers, or a mixture of such solvents so that the polymer product is preferably obtained as a very fine friable or fluffy precipitate. Typical solvents include hydrocarbons having 6 to 8 carbon atoms, benzene, tetralin, hexane, heptane, cyclohexane, carbon tetrachloride, chloroform, trichloroethylene, methyl chloride, ethyl chloride and methylene chloride; chlorofluoroalkanes such as chlorofluoromethane and chlorofluoroethane containing at least 4 halogen atoms; esters such as methyl acetate and ethyl acetate; and alcohols including methanol, ethanol, butanol and the like. The amount of organic medium used normally will be in excess of the monomers to be polymerized and the proportion may vary from at least 1 weight percent of monomers and 99 weight percent of organic medium up to about 50 weight percent monomers and 50 weight percent medium.

Buffering agents (d). Agents for buffering the compositions within the pH range optimum for silane stability can vary widely in type and amount. The selection of a suitable buffering agent is readily made by techniques well known to those of ordinary skill in this art. Especially convenient is to prepare a silane composition comprising the silane (a), the polymeric water thickening agent (b), and water (c) and to measure the pH and silane concentration initially and then to add the buffering agent candidate. The candidate to be acceptable should maintain the pH level within the said determinable pH range, even when adding substantial quantities of acid or bases, which would ordinarily cause the pH to swing into areas in which substantial silane hydrolysis will occur. Swings of plus or minus one pH unit are tolerable. Also relevant would be a pH swing induced by additions of a biocide that materially alters pH and promotes hydrolysis. Two methods are convenient for measuring long term stability: one is to determine final pH and final silane content, after aging, and the other is to performance test the silane emulsions on mortar cubes using standard test methods, such as those described in the above-mentioned DePasquale et al. patent. In the former, using an unsuitable buffering compound will not prevent the pH from swinging into a range promoting hydrolysis, e.g., from 7.5 to 4.0 and the final silane concentration will be materially reduced, e.g., cut from 40 percent to 20 percent and, in extreme cases, all the way down to zero percent. Such a test should be carried out over a significant time period, e.g., after aging the emulsion under test for up to 12 months at room temperature. In the performance test, a 2 inch mortar cube is coated in duplicate with the test emulsion and the coating cured, then immersed in water for 21 days. The percent reduction in weight gain of compound treated cubes compared to untreated control cubes is indicative of the retention of silane content and the efficacy of the buffering agent.

In initial experiments, emulsions were unbuffered and prepared in accordance with prior art procedures. They contained biocide which decomposed to acetic acid and lowered the pH to 4. Within a month of manufacture, such emulsions showed decreased performance in the water repellency test set forth above. They also showed reduced silane concentration, as determined by gas chromatography. After 5 months the state of the art emulsion performed very poorly in water repellency tests on concrete.

Numerous experiments which followed demonstrated that various buffers were effective in raising the pH of the state of the art emulsion to about 7.5, and maintaining the effectiveness of the formulation over a period of time.

When emulsions of predominantly n-octyltriethoxysilane, PCR, Inc.'s PROSIL ® 9202 organofunctional silane, buffered in this manner, were analyzed by gas chromatography after one year, over 95 percent of the silane remained unhydrolyzed. Moreover, unbuffered emulsions at pH 4 showed less than 5% unhydrolyzed silane after a similar period, indicating the long term stabilizing effect of the buffering compound.

Although buffers are especially important when the emulsion components, particularly biocides, shift the pH away from neutrality, experiments have shown that in other emulsions which are inherently neutral, pH 7, without use of a buffer, the silane remains substantially unhydrolyzed for many months. In such cases the emulsions do not contain a biocide, or they contain an alternative biocide, that does not alter the inherently neutral pH.

Illustrative of buffering agents useful for silane emulsions, especially those containing biocides are: organic and inorganic acids and bases, including salts thereof, and preferably mono- or poly-alkali metal, alkaline earth metal or amine salts of carbonic acid, phosphoric acid, sulfuric acid, hydrosulfuric acid, a $C_1$-$C_6$ organo-, mono- or poly-carboxylic acid, or a $C_2$-$C_{30}$ alkyleneiminopolycarboxylic acid, ammonia, a $C_1$-$C_{30}$ organic base, or a mixture of any of the foregoing. Illustrative are: sodium bicarbonate, sodium carbonate, ammonium carbonate, sodium borate, mono-, di-, or trisodium phosphate, mono-, di-, or tripotassium phosphate, ammonium sodium phosphate, mono-, or disodium sulfate, sodium acetate, potassium acetate, ammonium acetate, calcium acetate, sodium formate, mono-, or disodium sulfide, ammonia, mono-, di-, or triethylamine, mono-, di-, or triethanolamine, (ethylenedinitrilo) tetraacetic acid sodium salt (sodium E.D.T.A.), pyridine, aniline, and sodium silicate. These are only a few examples of appropriate buffering agents. Combinations of these materials with other buffers, acids, or bases, such as the use of ammonium hydroxide and acetic acid together, will also be effective.

Trisodium phosphate ($Na_3PO_4$) and ammonium hydroxide ($NH_4OH$) are preferred, but sodium bicarbonate ($NaHCO_3$) is especially preferred because it is easy to handle; it consistently gives emulsions with a pH of 7.5; it is environmentally safe; and it is inexpensive.

The amount of buffering agent to be employed can vary widely. In general, however, less than 0.01 percent will not be enough to be useful, and more than 5% by weight of the total composition will be uneconomical.

If a biocidal agent (f) is used, any of those well known in the art for imparting antimicrobial and biocidal activity can be used in conventional amounts, e.g., from about 0.1 to about 5 percent by weight based on the composition. Suitable biocidal agents for these embodiments comprise 6-acetoxy-2,4-dimethyl-m-dioxane, sold by Givaudan Corp. under the trademark Giv-Gard DXN biocide, methyl p-methoxy benzoate, methyl paraben and the like. Typical concentrations of these biocides are 0.15 percent by weight.

In addition to biocides, the formulations of this invention may include other additives such as fragrances, colorants, thickeners, foaming agents, anti-foaming agents, and the like.

In other preferred compositions a conventional water beading additive (e) may be included in the composition. The addition of a water beading additive supplies the desired visual effect of water repellency. Especially suitable water beading additives for the purposes of the present invention are hydrophilic fumed silica, micronized Teflon®, tetrafluoroethylene, beads, fatty acid salts, and wax although any such conventional additives may be employed.

The substrate, preferably dried, to be impregnated can be coated with the compositions of this invention by brushing or by spraying. The quantity to be applied is determined largely by the structure of the particular substrate and by the degree of water repellency it is desired to impart. Good results may be obtained with amounts as small as 75 g/m$^2$ of an impregnating agent consisting of an aqueous emulsion containing 1 to 40 weight percent of the hydrolyzed silane. The hydrophobic effect will manifest itself after about 4 hours of curing. It is preferred that the composition be allowed to cure for from about 4 to about 350 hours at a temperature of from about 5° to 50° C.

DESCRIPTION OF THE PREFERRED EMBODIMENTS

The following examples illustrate the present invention. They are not to be construed to limit the claims in any manner whatsoever.

EXAMPLE 1

To 472 g of deionized water, which contains methyl paraben as a biocide in an amount to provide 0.15 percent ultimate concentration, in a Waring Blendor mixer is slowly added a blend of 25 g octyltriethoxysilane and 0.75 g Carbopol® 1342. Mixer speed is gradually increased to provide good dispersion without incorporating a lot of air. After complete addition, the mixture is stirred at high speed for 5 minutes to facilitate hydration of the Carbopol® 1342. While continuing to mix at high speed, 2.75 g of triethanolamine are slowly added to the mixture to neutralize the Carbopol® 1342 thus thickening the emulsion. After an additional 5 minutes mixing, sodium bicarbonate is slowly added to the emulsion while mixing in an amount to provide 0.10 percent final concentration. An additional 1 minute of high speed mixing yields a buffered emulsion in accordance with this invention, having a pH of 7.5, and which maintains its homogeneous milky appearance for up to a year or more at room temperature.

EXAMPLE 2

The procedure of Example 1 is followed except 1.0 g of hydrophobic fumed silica is added to the mixture. A stable aqueous silane emulsion composition is formed in accordance with the appended claims.

EXAMPLES 3-6

The procedure of Example 2 is repeated substituting micronized Teflon® beads, wax, fatty acid salts and a mixture thereof for the hydrophobic fumed silica. Stable aqueous silane emulsion compositions are formed in accordance with the appended claims.

EXAMPLES 7 AND 8

The procedure of Example 1 is repeated substituting for the sodium bicarbonate, disodium hydrogen phosphate and a mixture of ammonium hydroxide and acetic acid as buffering agents. Stable aqueous silane emulsion compositions are formed in accordance with the appended claims.

The above-mentioned patents and patent applications are incorporated herein by reference.

Many variations of the present invention will suggest themselves to those skilled in this art in light of the above detailed description. For example, instead of Carbopol® 1342 any water thickening agent comprising the polymerization product an olefinically unsaturated carboxylic monomer and an acrylate ester of the formula $$CH=\underset{\underset{R_1}{|}}{C}-\underset{\underset{}{\overset{O}{\|}}}{C}-O-R$$

wherein R is an alkyl radical containing 10 to 30 carbon atoms and R$_1$ is hydrogen, methyl or ethyl may be employed. It is also contemplated to employ any conventional biocide, buffering agent and water beading additive. All such obvious modifications are within the full intended scope of the claims.

I claim:
1. An aqueous silane emulsion composition comprising effective amounts of:
   (a) a hydrolyzable silane essentially stable within a determinable pH range:
   (b) a water thickening agent which comprises the polymerization product of
      (i) an olefinically unsaturated carboxylic monomer;
      (ii) an acrylate ester of the formula

$$CH_2=\underset{\underset{R_1}{|}}{C}-\underset{\underset{}{\overset{O}{\|}}}{C}-O-R$$

wherein R is an alkyl radical containing 10 to 30 carbon atoms and R$_1$ is hydrogen, methyl or ethyl; and optionally
   (iii) a polymerizable crosslinking monomer containing a CH$_2$=C< grouping and at least one other polymerizable grouping, the unsaturated bonds of said polymerizable grouping being nonconjugated with respect to each other;
   (c) water; and optionally
   (d) at least one compound for buffering the pH of said composition within said determinable pH range.
2. A composition as defined in claim 1 which further comprises
   (e) an effective amount of a water beading additive selected from the group consisting of micronized tetrafluoroethylene beads, fatty acid salts, wax and hydrophobic fumed silica.

3. A composition as defined in claim 2 wherein said water beading additive (e) comprises a hydrophobic fumed silica.

4. A composition as defined in claim 1 wherein said hydrolyzable silane (a) comprises from about 1 to about 40 percent by weight of the composition; said water thickening agent (b) comprises from about 0.1 to about 20 percent by weight based on (a); and water (c) is present in an amount sufficient to provide 100 percent by weight.

5. A composition as defined in claim 4 wherein said compound for buffering (d) comprises from about 0.01 to about 5 percent by weight based on (a), (b), (c) and (d) combined.

6. A composition as defined in claim 1 wherein said hydrolyzable silane has a molecular weight of up to about 600 and comprises a compound of the general formula

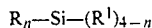

wherein R is $C_1$-$C_{30}$ hydrocarbyl or halogenated hydrocarbyl, R is $C_1$-$C_6$ alkoxy, halide, amino, carboxyl or a mixture of any of the foregoing and n is 1 or 2, or an oligomer of said compound.

7. A composition as defined in claim 6 wherein said silane comprises an alkylalkoxysilane.

8. A composition as defined in claim 7 wherein said silane comprises an alkyltrialkoxysilane.

9. A composition as defined in claim 6 wherein R comprises a $C_8$-$C_{20}$ alkyl group, $R^1$ comprises a $C_1$-$C_3$ alkoxy group and n is 1.

10. A composition as defined in claim 1 wherein said silane comprises octyltriethoxysilane.

11. A composition as defined in claim 4 wherein the concentration of said silane (a) comprises from about 2 to about 20 percent by weight of said composition.

12. A composition as defined in claim 1 wherein said carboxylic monomer (b)(i) is selected from the group consisting of acrylic acid, methacrylic acid, ethacrylic acid, maleic anhydride and maleic acid.

13. A composition as defined in claim 1 wherein said polymerizable crosslinking monomer (b)(iii) comprises a polyalkenyl polyether of a polyhydric alcohol containing more than one alkenyl ether grouping per molecule, the parent polyhydric alcohol containing at least four carbon atoms and at least three hydroxyl groups.

14. A composition as defined in claim 1 wherein said water thickening agent (b) comprises from about 50 to about 98.8 weight percent of said carboxylic monomer and from about 1 to about 50 weight percent of said acrylate ester based on the total weight of said water thickening agent.

15. A composition as defined in claim 1 wherein said water thickening agent (b) comprises from about 50 to about 98.8 weight percent of said carboxylic monomer, from about 1.0 to about 39.9 weight percent of said acrylate ester and from about 0.1 to about 6.0 weight percent of said polymerizable crosslinking monomer based on the total weight of said water thickening agent.

16. A composition as defined in claim 15 comprising from about 70 to about 95 percent by weight of acrylic acid, from about 1 to about 29.5 weight percent of an acrylate ester selected from the group consisting of lauryl acrylate, stearyl acrylate and stearyl methacrylate and from about 0.1 to about 1.0 weight percent of said polymerizable crosslinking monomer based on the total weight of said water thickening agent.

17. A composition as defined in claim 1 wherein said water thickening agent (b) comprises from about 1 to about 8 percent by weight based on silane (a).

18. A composition as defined in claim 1 wherein said compound for buffering (d) comprises a mono- or polyalkali metal, alkaline earth metal or amine salt of carbonic acid, phosphoric acid, sulfuric acid, hydrosulfuric acid, a $C_1$-$C_6$ organo-, or polycarboxylic acid, or a $C_2$-$C_{30}$ alkyleneiminopolycarboxylic acid, ammonia, a $C_1$-$C_{30}$ organic base or a mixture of any of the foregoing.

19. A composition as defined in claim 18 wherein said compound for buffering (d) comprises an alkali metal carbonate or -bicarbonate, or -phosphate or ammonia.

20. A composition as defined in claim 19 wherein said compound for buffering (d) comprises sodium bicarbonate.

21. A composition as defined in claim 1 wherein said compound for buffering (d) provides a pH in the range of from about 6 to about 8.

22. A composition as defined in claim 21 wherein said compound for buffering (d) provides a pH of about 7.5.

23. A composition as defined in claim 1 which further comprises (f) a small effective amount of a biocide.

24. A composition as defined in claim 1 which further comprises:
(e) an effective amount of water beading additive selected from the group consisting of micronized Teflon ® beads, fatty acid salts, wax and hydrophobic fumed silica; and
(f) a small effective amount of a biocide.

* * * * *